July 31, 1956    M. BARRERE    2,756,893
SECTIONAL CONTAINERS, PARTICULARLY FOR
AIRCRAFT AND SIMILAR APPLICATIONS
Filed Sept. 5, 1952
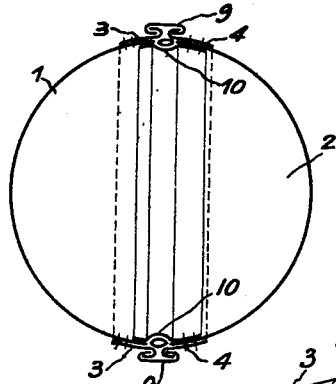
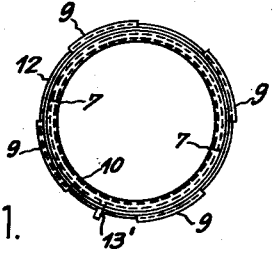
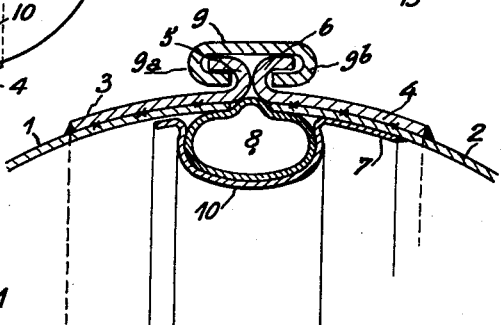
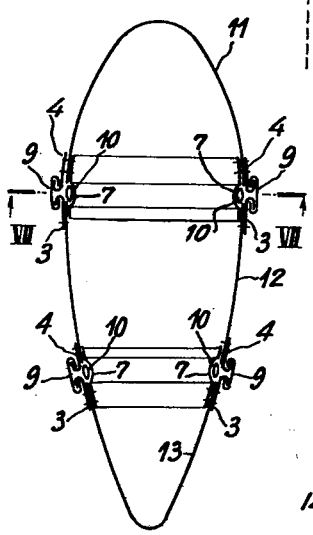
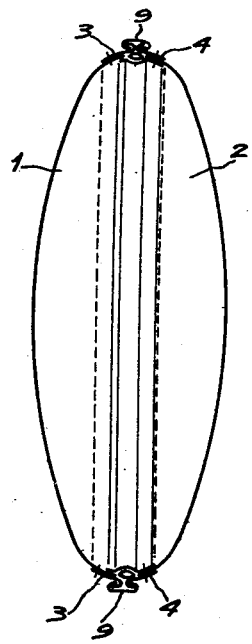
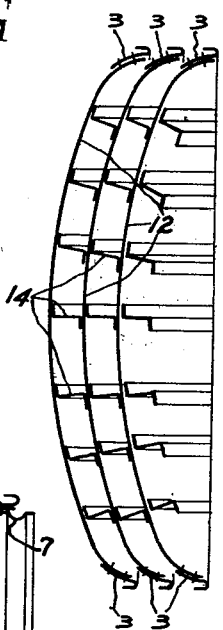
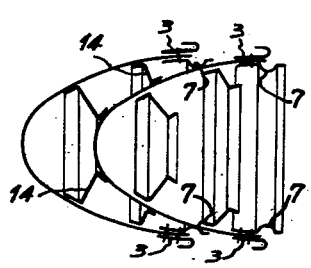
INVENTOR
MAURICE BARRERE
BY
ATTY.

U̇nited States Patent Office 2,756,893
Patented July 31, 1956

2,756,893

SECTIONAL CONTAINERS, PARTICULARLY FOR AIRCRAFT AND SIMILAR APPLICATIONS

Maurice Barrere, Gennevilliers, France, assignor to Societe d'Etudes et de Constructions Aero-Navales, Gennevilliers, France Application September 5, 1952, Serial No. 307,965

Claims priority, application France June 19, 1952

5 Claims. (Cl. 220—5)

It is common practice, particularly in aeronautics, to use additional detachable tanks for increasing the radius of action of aircraft and for the transportation of freight or equipment of any nature whatever. These tanks are generally mounted at the wing tips or under the wings, or on the front portion of the fuselage, and they should be capable of being dropped in flight, especially in case of air fighting or, more simply, before the aircraft lands, particularly if it has a high landing speed.

Tanks generally manufactured for this utilization are made in one piece, and, consequently, they are very cumbersome although their weight is small, which causes very great difficulties for their delivery, since they require the use of transport means out of proportion with the weight carried. This drawback is particularly serious when said tanks are to be transported in the vicinity of a battlefield.

The present invention obviates these drawbacks by creating a sectional fuel container, especially for aircraft and similar applications.

In accordance with the invention, the fuel container consists of at least two elements fitting into each other, and offering on their edges, reversely bent channel elements designed for cooperating together and with an element connecting them for uniting the various elements, the tightness of the joint thus created being ensured by a resilient tube capable of being inflated, which is held in a housing formed by a section iron associated with one of the constitutive elements of the tank.

The particular construction of the tanks according to the invention makes it possible to transport them much more easily by fitting the various constitutive elements into one another, and, in addition, they may be assembled on the very site of utilization by an unskilled personnel such as soldiers and this without using any particular tools.

Various other characteristics and advantages of the tank according to the invention will appear from the following detailed description.

Types of embodiment of the object of the invention are shown, by way of non limitative examples in the appended drawing.

Figure 1 is a sectional elevation of the clamping device of the shell sections of the fuel container according to the invention.

Figure 2 is a diagrammatic transverse section of a tank.

Figure 3 is a diagrammatic sectional elevation of a second tank.

Figure 4 is a diagrammatic section illustrating one method of arrangement of several shell elements of a tank.

Figure 5 is a diagrammatic section of a tank, illustrating another type of embodiment.

Figure 6 is a section similar to Fgure 4, illustrating a second method of arrangement of tank elements.

Figure 7 is a section along line VII—VII of Figure 5.

In Figures 2 and 3, the tank consists of two half-shells 1 and 2 which are symmetrical and which may have any desired shape, for instance a semi-spherical shape, the shape of a half ellipsoid of revolution, etc.

Metal strips 3 and 4, one side of which is bent back as shown particularly in Figure 1, so as to form channels 5, 6, are secured all around the periphery of each one of the half shells 1, 2 and on the outside thereof.

The strips 3 and 4 are secured to the half shells 1 and 2 by any suitable means, but preferably by spot welding or by crimping.

One of the half shells, half shell 2, for instance, supports near its periphery, a section element 7, consisting of a sheet of metal bent and formed so as to constitute a housing 10, the extreme free edge of which being bent so as to bear against the inner wall of the other half shell.

This section element 7 is associated with the half shell 2 by welding similar to the weldings used for securing the strips or by any other suitable means.

9 designates a channel shaped locking strip, the edges of which 9a and 9b are folded back so that these edges enter the channels 5, 6 formed by the strips 3 and 4.

The strip 9 connects the two strips 3 and 4 together and consequently the two half shells 1 and 2 to ensure the assembling of the tank or container constituted by these two half shells.

The tightness of the joint formed by the two channels 5, 6 held against each other by the locking strip 9 is ensured by an air tube 8 which is placed in the housing 10 limited by the section element 7.

The air tube 8 is provided with a valve, not shown, making it possible to inflate it.

According to the type of embodiment shown in Figures 5 and 7 the tank consists of three shell elements 11, 12, 13 said elements comprising respectively, along their edges, strips similar to strips 3 and 4, so that these elements can be connected together in the same manner as above described.

This particular method of manufacture of the tanks makes it possible, for their transport, for instance, or their storing, to arrange them by fitting them inside one another, as shown respectively in Figures 4 and 6 according to the type of embodiment selected for their manufacturing (type of embodiment of Figures 2, 3 or 5).

In Figures 4 and 6, 14 designates section elements which are secured inside the half shells 1, 2 or the elements 11, 12, 13, the purpose of these elements being to stiffen the fuel container or tank when assembled.

Considering the form of embodiment of Figures 2 and 3, the lengths of the strips 3 and 4 as well as that of the strips 9 are so calculated that these strips extend to the two ends of the tank, keeping, however, a free space at one end, to make it possible to arrange the strips 9 as explained hereinafter.

According to the type of embodiment of Figures 5 and 6 the strips 3 and 4 as well as the strips 9 are arranged as shown in Figure 7 so that the strips 3 and 4 are separated from one another by a distance at least equal to the length of the strips to make it possible to engage the strips 9 for overlapping. The section element 7 used for forming the housing 10 in which the air tube is arranged, has a length obviously equal to the perimeter of the shell element considered.

When it is desired to assemble a tank, the air tube 8 is arranged inside the housing 10 formed by the section element 7 then the half shell 3 is moved closer to the half shell 2 after which the strip 9 is engaged by one of its ends so that its edges enter the channels 5, 6 of the strips 3, 4 then the strip 9 is pushed so as to have its cover entirely the channels 5, 6. The air tube 8 is then inflated to a pressure higher than the pressure which should normally obtain inside the tank, so that the joint existing between the two half shells constituting the tank is made completely tight.

According to the form of embodiment of Figures 5, 6 and 7, the strips 9 are laid in the manner described above, engaging them successively so that they cover the channels 5, 6 formed by the various sets of strips 3, 4. The air tube is then inflated through the valve 13' shown in Figure 7.

The invention is not limited to the examples of embodiment represented and described in detail as various modifications may be made thereto within its scope. In particular, the shapes of the section elements 7 and/or the strips 3, 4 and 9 may be different as well as their modes of attachment, respectively on the half shells and/or the elements constituting the tank. In particular, these section elements or strips may be attached as explained by welding, riveting or bolting, etc. Similarly, the air tube or tubes used may be made of natural or synthetic rubber or various other materials, according to the nature of the products to be contained in the tanks.

I claim:

1. An aircraft fuel container comprising a plurality of concave shell elements formed for edge to edge assemblage, each shell element having at its edge a reversely bent channel portion the free edge of which overlies its respective shell element, a channel shaped locking strip having its longitudinal edges inturned and nested in the reversely bent channel portions of adjacent shell elements for securing the shell elements together to form a container, a metal strip secured to the inside of one shell element adjacent the edge thereof and extending beyond the edge of the adjacent shell element, said strip being concave to form a housing, and an endless inflated resilient tube located within said housing to form a tight joint between the shell elements of the container.

2. A fuel container as set forth in claim 1, including stiffening elements secured inside said shell elements.

3. A fuel container comprising a central tubular section and outer concave shell sections formed for edge to edge assemblage, each shell section having at its edge a reversely bent channel portion the free edge of which overlies its respective shell section, channel shaped locking strips having their longitudinal edges inturned and nested in the reversely bent channel portions of adjacent container sections, metal strips secured to each shell section adjacent the edge thereof and extending beyond the edge of the adjacent container section, each strip being concave to form a housing, and an endless inflated resilient tube located in each housing to form tight joints between the container sections.

4. An aircraft fuel container comprising a plurality of concave shell elements formed for edge to edge assemblage, each shell element having at its edge a reversely bent channel portion the free edge of which overlies its respective shell element, clamping bands, C-shaped in cross-section, having their inner edges nested into the reversely bent channel portions of adjacent shell elements for securing the shell elements together to form a container, a metal strip secured to the inside of one shell element adjacent the edge thereof and extending beyond the edge of the adjacent shell element, said strip being concave to form a housing, and an endless inflated resilient tube located within said housing to form a tight joint between the shell elements of the container.

5. An aircraft fuel container comprising two concave half shells placed edge to edge to form a container, such shells are of a shape that they can be nested into each other before assemblage, each shell having at its edge a reversely bent channel portion the free edge of which overlies its respective shell, a clamping band, C-shaped in cross-section, having its inturned portions nested in the reversely bent channel portions of the shells for securing the shells together, a metal strip secured to the inside of one shell adjacent the edge thereof and extending beyond the edge of the adjacent shell, said strip being concave to form a housing and an endless inflated resilient tube located within said housing to form a tight joint between the shells of the container.

References Cited in the file of this patent

UNITED STATES PATENTS

| | | |
|---|---|---|
| 429,660 | Sullivan | June 10, 1890 |
| 1,268,064 | Johnson | May 28, 1918 |
| 1,486,515 | Cuthbertson | Mar. 11, 1924 |
| 2,277,824 | Franson | Mar. 31, 1942 |
| 2,402,253 | Macleod | June 18, 1946 |
| 2,471,296 | Allen et al | May 24, 1949 |

FOREIGN PATENTS

| | | |
|---|---|---|
| 641,348 | France | Apr. 16, 1928 |
| 543,448 | Great Britain | Feb. 25, 1942 |